Nov. 20, 1956
L. E. R. UMNEY
2,771,079
METHOD AND APPARATUS FOR SEPARATING MATERIALS
Filed Nov. 12, 1953
4 Sheets-Sheet 1
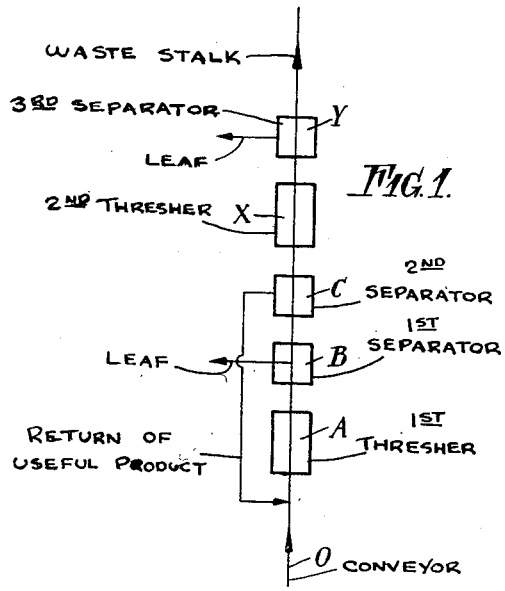
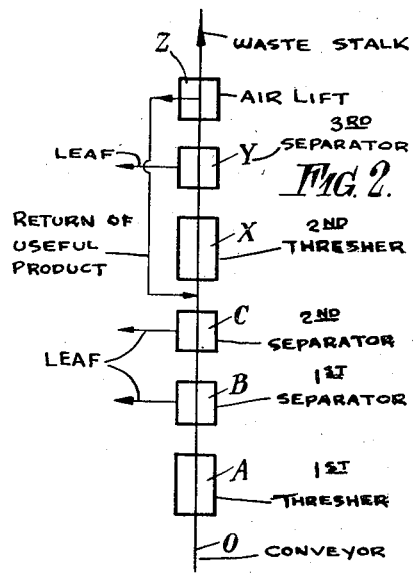
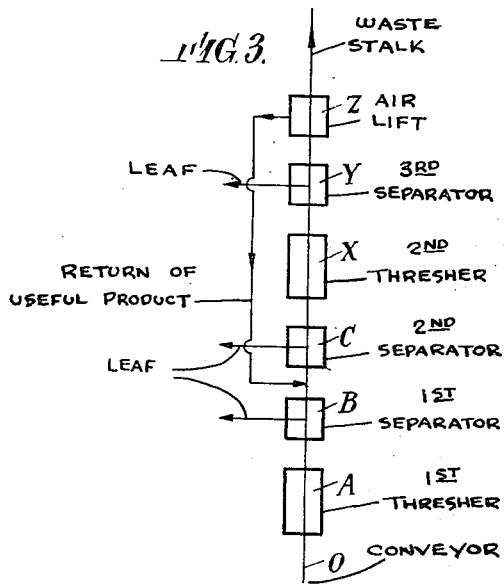
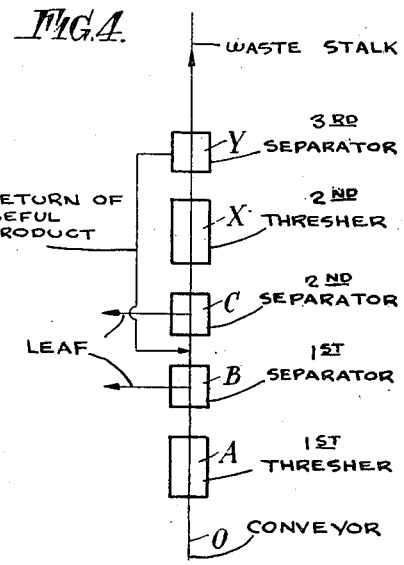
INVENTOR
LAURIE EDWARD RICHARD UMNEY

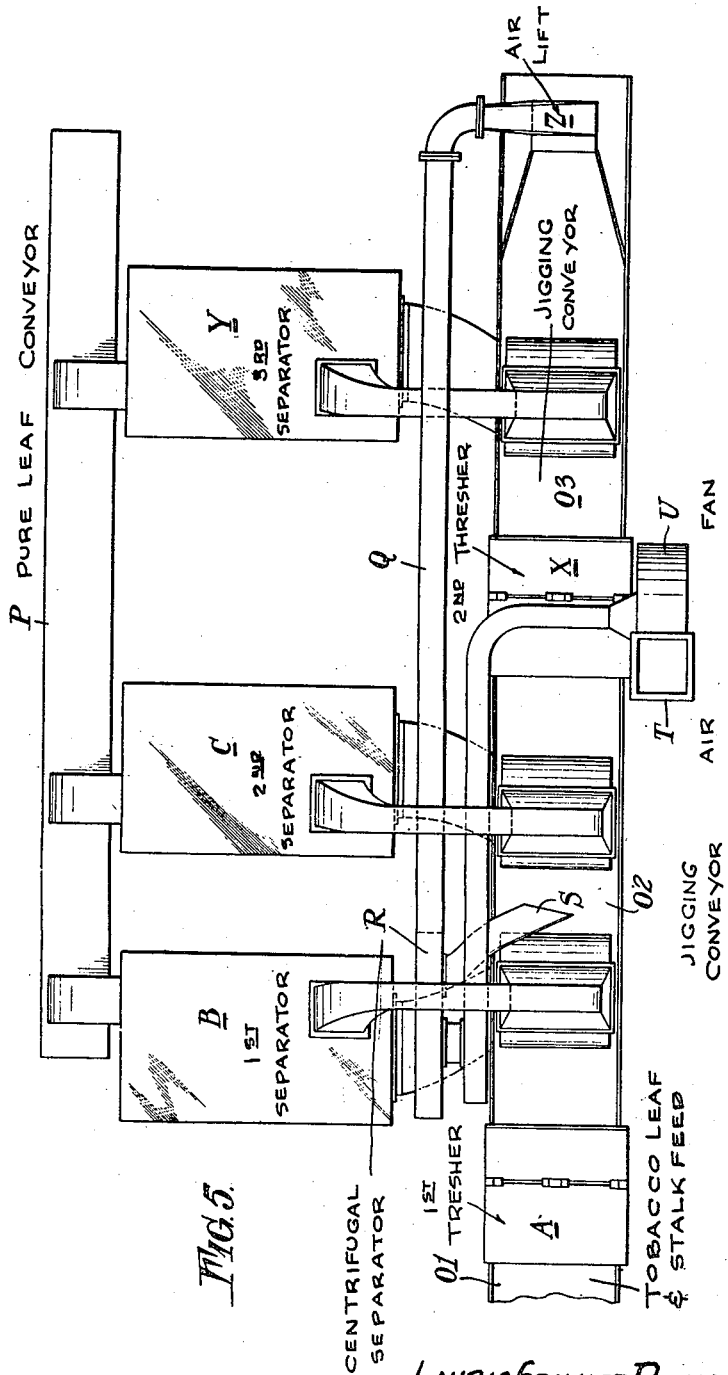

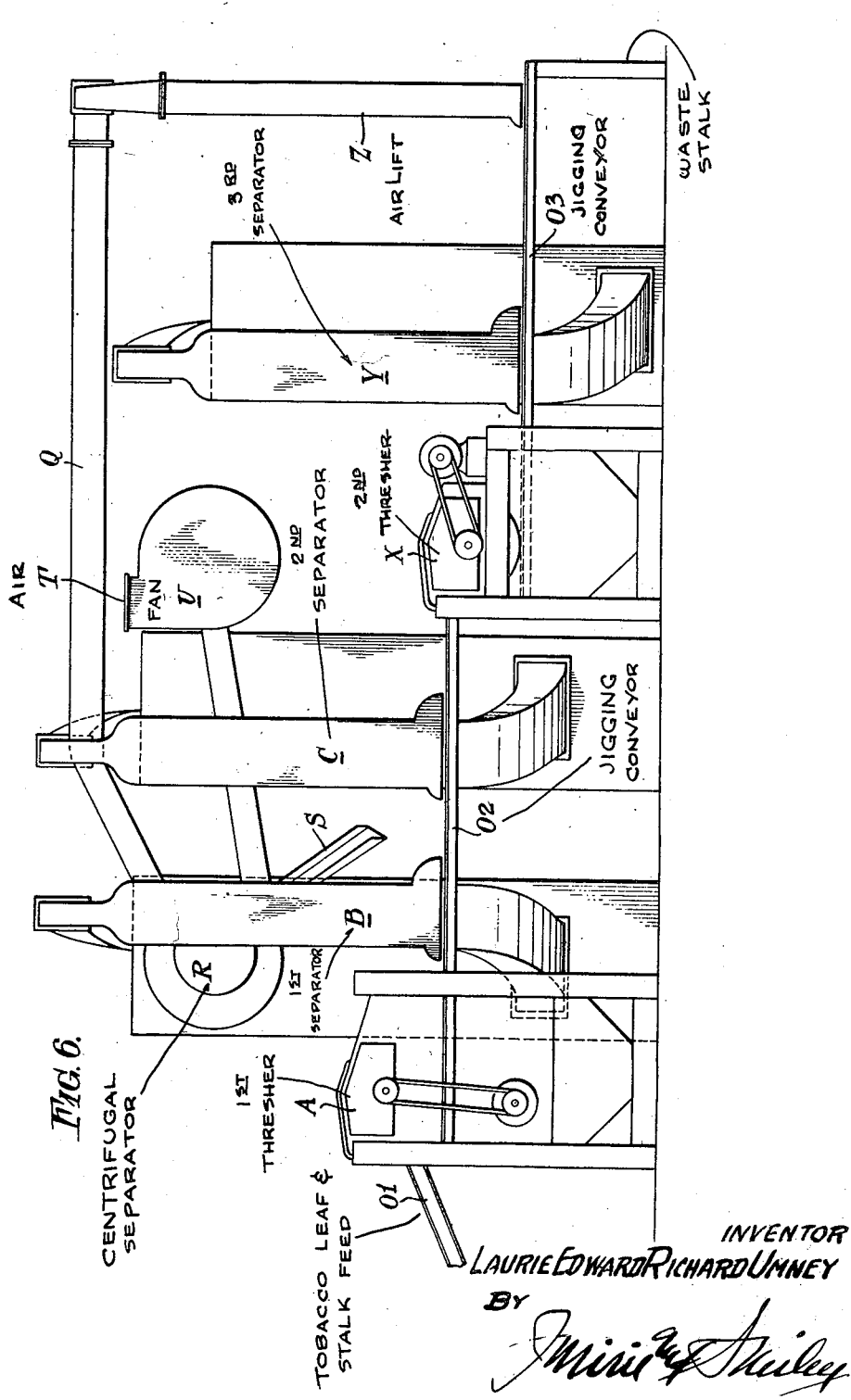

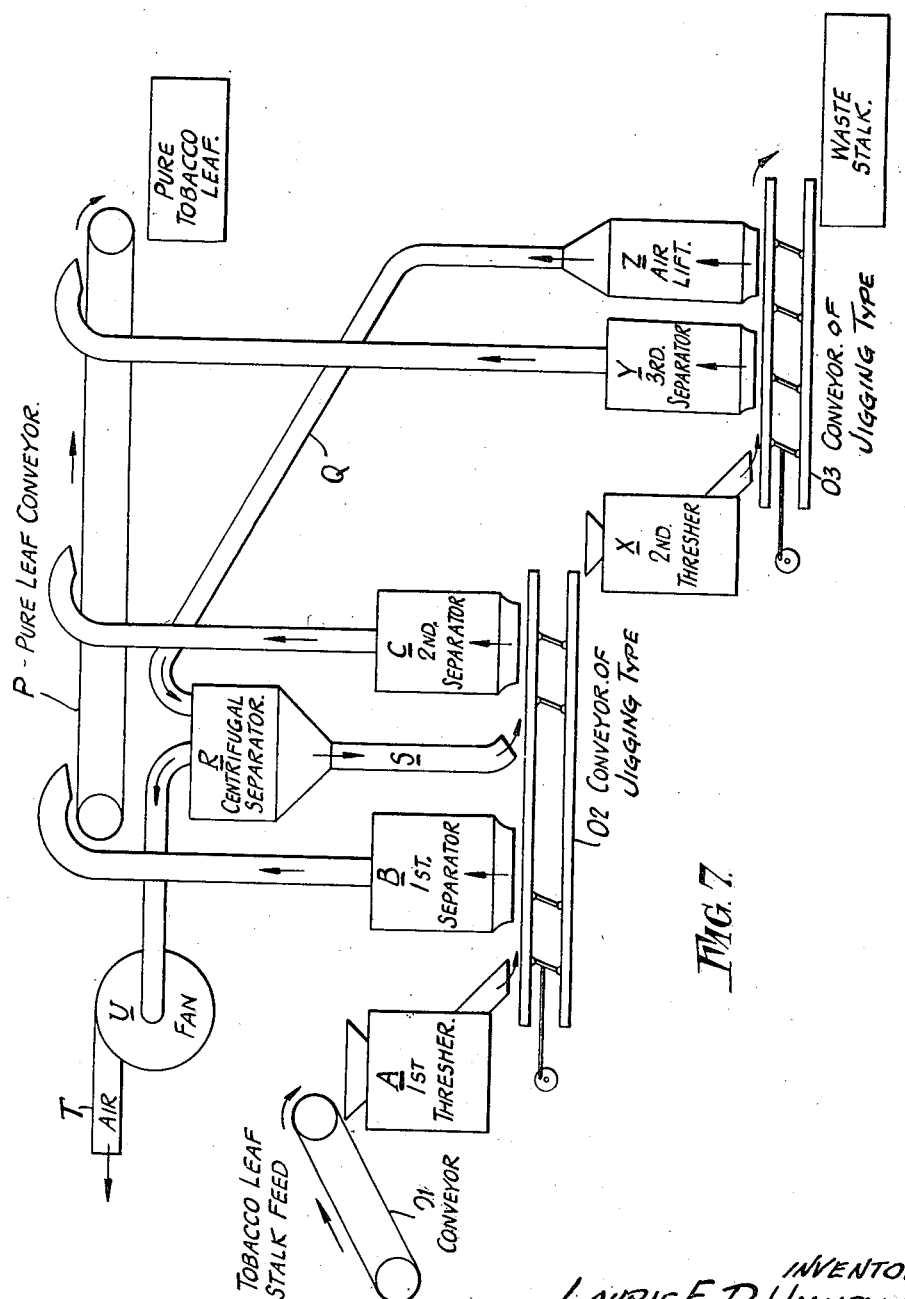

United States Patent Office 2,771,079
Patented Nov. 20, 1956

2,771,079

METHOD AND APPARATUS FOR SEPARATING MATERIALS

Laurie E. R. Umney, Guildford, Surrey, England, assignor to Vokes Limited, Guildford, England Application November 12, 1953, Serial No. 391,694

6 Claims. (Cl. 131—146)

This invention concerns an improved method and apparatus for separating a wanted product from a mixture of that product with a waste product. The invention is especially useful in the treatment of tobacco.

In a known tobacco leaf treatment leaf and stalk is subjected to treatment in a series of drum-type threshing machines of diminishing pass characteristics and each threshing treatment is followed by a separation treatment in a centrifugal or like separator to extract useful leaf particles from unwanted stalk. There may be as many as five or six threshing machines and a like number of separators.

It is the object of the present invention to provide a method and apparatus for carrying out such separation of materials more cheaply and simply.

According to the invention apparatus of the kind employing threshers and separators for the separation of a mixed material into a wanted product and a waste product consists of a first thresher of high pass characteristics, means to feed the output of this thresher to at least one separator giving a useful product and a residue product, means to feed the residue product to a second thresher of relatively lower pass characteristics, means to feed the output of the second thresher to at least one further separator and means to recirculate a potentially useful product from one separator to the inlet side of the thresher from which it is fed. A thresher or comminuting machine suitable for the operation of the invention is shown for example in Patent No. 2,312,478, issued March 2, 1943 to Randolph. By thresher of "high pass characteristics" is meant one which will produce leaf fragments up to three inches maximum dimension and by thresher of "low pass characteristics" is meant one which will produce leaf fragments up to one inch maximum dimension.

According to a further feature of the invention a single conveyor is employed to transport the useful product output of all the separators providing such an output. A single conveyor is also employed to transport the output of each thresher to the separator or separators served thereby.

The actual arrangement of the recirculation system can be altered to suit particular conditions of the material to be dealt with. In one arrangement the potentially useful output product of the second of two separators in series fed from the first thresher is recirculated directly to the inlet of the first thresher, while a useful product is taken from the first of those separators and from a single separator fed from the second thresher.

In another arrangement the potentially useful product is recirculated from the second of two separators in series fed from the second thresher directly back to the inlet of the second thresher, while a useful product is taken from both of two separators fed from the first thresher and from the first of the separators fed from the second thresher.

In a third arrangement only one separator is fed from the second thresher and the potentially useful product from this separator is returned to the inlet side of the second thresher at a position where it is first subjected to a separation process by the second of two separators in series fed by the first thresher.

The above and other parts of the invention are embodied in preferred apparatus for separating mixed tobacco leaf and stalk which will now be described in some detail by way of example with reference to the accompanying drawings in which:

Fig. 1 is a flow diagram of a preferred form of separation apparatus,

Figs. 2, 3 and 4 are flow diagrams of basically similar apparatus to that shown in Fig. 1 but employing different recirculation systems, Fig. 5 is a plan view of apparatus shown in the flow diagram of Fig. 3.

Fig. 6 is a side elevation of the apparatus shown in Fig. 5.

Fig. 7 is a diagrammatic layout of the apparatus shown in Figs. 5 and 6.

Referring first to Fig. 1 the line O represents a conveyor or conveyors by which a mixture of tobacco leaf and stalk is fed to the elements comprising the separation apparatus.

A first thresher A of high pass characteristics is followed by a pair of separators B and C. The separator B has an output of pure leaf which is directly useful and the separator C, which acts upon the residue product of separator B, has a potentially useful output of fairly large leaf and stalk which is returned to the inlet of the thresher A for reprocessing. The residue product from the separator C is fed into the inlet of a second thresher X of relatively low pass characteristics and the output from this thresher, which comprises smaller leaf and stalk fragments is fed to a separator Y which abstracts all the leaf from the mixture leaving a residue of stalk to be fed off from the end conveyor.

One variation in the location of the recirculation system is illustrated in Fig. 2.

In this system the thresher X is followed by two separators in series Y and Z. The separator Z is of the simple air lift type and removes from the residue product of separator Y all but the useless stalk which is fed off from the end of the conveyor O.

The potentially useful material lifted by the separator Z is returned directly to the inlet of the thresher X for reprocessing. A useful product is fed away from the separators B, C and Y.

In a further variation, shown in Fig. 3, the arrangement is similar to that of Fig. 2 but the potentially useful material is returned to the inlet side of thresher X at an earlier point in the system namely to the conveyor O at a position anterior to separator C. A useful product is again fed off from the separators B, C and Y.

In yet another variation, shown in Fig. 4, the thresher X is followed by only one separator Y which lifts all but useless stalk from the conveyor O and returns it to a point anterior to separator C. In this case a useful product is provided by separators B and C only.

The construction of separation apparatus according to the invention is shown in Figs. 5 and 6 and diagrammatically illustrated in Fig. 7 of a plant having the recirculation system of Fig. 3.

A conveyor system O is made in three parts; O1, O2 and O3; the conveyor O1, shown at the left-hand side, feeds a mixture of tobacco leaf and stalk to a rotary drum thresher A.

The threshed product consisting of leaf fragments up to 3 inches maximum dimension is fed out from the thresher onto the central conveyor O2 which is of the jigging type, such as that shown for example in Patents Nos. 1,865,403 and Re. 22,008, issued June 2, 1932 and January 20, 1942, and has perforated sections where it runs between upper and lower ducts of separators B and C, which provide an upward flow of air through the perforated sections.

The separator B lifts from the conveyor the largest and lightest leaf portions, separates them from the air stream and delivers them onto a conveyor P.

The separator C has an intenser air flow and lifts leaf fragments of smaller size which are similarly delivered to conveyor P.

The material left upon the central conveyor O2 consists of bare stalk and stalk fragments to which some leaf is still attached.

This material is fed to the inlet of a second rotary thresher X and is there resolved into smaller fragments of which the pure leaf components have a maximum dimension up to 1 inch.

The right hand conveyor O3 transports this product to a third separator Y, whose air flow is adjusted to pick up the pure leaf fragments for feeding to the conveyor P, leaving on the conveyor O3 a potentially useful product consisting of smaller sized stalks with leaf adhering and a waste product consisting of bare stalk fragments.

This residue product is led under a fourth separator Z of the simple air lift type. The air flow of the separator Z is adjusted to lift all but the useless stalk which is fed to waste off the end of conveyor O3.

The potentially useful product is fed from the separator Z through a duct Q to a centrifugal separator R where it is separated from the air stream and fed back onto the central conveyor O2 at a point anterior to the separator C down a chute S.

Any pure leaf fragments detached from the stalk during the passage of the potentially useful product back to the conveyor O2 is separated out in the separator C while the residue is conveyed on to the thresher X for reprocessing.

The air from the eye of the centrifugal separator R is discharged to atmosphere through a trunking T led from a fan U.

I claim:

1. A comminuting system for vegetable or leafy products, such as tobacco leaf, and for separating the mixture material into a wanted product, such as tobacco particles, and a waste product, such as stalk, comprising a threshing or reduction apparatus for breaking up the material into a mixture of large and small particles, means for feeding said mixture output to at least one separator apparatus, means in said separator apparatus separating said output into a useful product and a residue including a waste product and a potentially useful product, means for feeding the residue to a second threshing apparatus for breaking up said residue into a mixture of particles smaller in size than the first mentioned mixture, means for feeding the output of the second threshing apparatus to at least one further separator apparatus, means in said second separator apparatus for separating said last mentioned mixture into a useful product and a residue including still potentially useful particles or product, means for collecting the useful product from each of said separator apparatus, and means for recirculating the potentially useful product from one separator apparatus to the inlet side of the threshing apparatus from which it is fed.

2. A system as defined in claim 1, including a single conveyor for transporting the useful output of all the separator apparatus to a point of usage.

3. A system as set forth in claim 1, including means for feeding two separators in series from the first threshing apparatus and means for recirculating the potentially useful product directly to the inlet of the threshing apparatus from the second separator of the series.

4. A system as set forth in claim 1, including means for feeding two separators in series from the second threshing apparatus and means for recirculating the potentially useful product directly to the inlet of the said second threshing apparatus from the second separator of the series.

5. A system as defined in claim 1, including means for feeding two separators in series from each threshing apparatus, and means for recirculating to the inlet of the second separator of the series fed by the first threshing apparatus from the second separator of the series fed by the second threshing apparatus.

6. A system for breaking up tobacco and separating it into useful leaf fragments and stalk comprising a first threshing means for breaking up the tobacco into a mixture of stalk and leaf fragments up to 3 inches maximum dimension, a conveyor conveying said mixture to a first separator, means within the first separator for producing and collecting an output of leaf fragments and for producing a residue product having a potentially useful output of fairly large leaf fragments and stalk, means for conveying said residue to the inlet of a second threshing means for breaking up said residue into a mixture of stalk and leaf fragments of a size up to 1 inch maximum dimension, means for conveying said last mentioned mixture to a second separator, means within the second separator for producing an output of pure leaf fragments of smaller size and a residue of stalk, means for conveying said mixture to a third separator so abstract all the leaf fragments from the mixture leaving a residue of stalk, and means for feeding off said stalk from the end of the conveyor.

References Cited in the file of this patent

UNITED STATES PATENTS

| | | |
|---|---|---|
| 1,562,618 | Burch | Nov. 24, 1925 |
| 2,332,701 | Dowsett | Oct. 26, 1943 |
| 2,609,150 | Bludeau | Sept. 2, 1952 |
| 2,668,667 | Fern et al. | Feb. 9, 1954 |